United States Patent [19]

Kiely

[11] 4,411,223

[45] Oct. 25, 1983

[54] METHOD OF OPERATING AN I.C. ENGINE

[76] Inventor: Martin Kiely, Airglooney, Tuam, Co. Galway, Ireland

[21] Appl. No.: 275,512

[22] Filed: Jun. 19, 1981

[30] Foreign Application Priority Data

Jun. 20, 1980 [IE] Ireland ................................. 1292/80
May 14, 1981 [IE] Ireland ................................. 1079/81

[51] Int. Cl.³ ...................... F02B 43/08; F02B 75/12
[52] U.S. Cl. ..................................... 123/3; 123/1 A; 123/25 E; 123/DIG. 12
[58] Field of Search ................... 123/1 A, 3, DIG. 12, 123/25 E, 575, 577

[56] References Cited

U.S. PATENT DOCUMENTS

| Re. 28,547 | 9/1975 | Pacheco ................................. 123/3 |
| 3,799,124 | 3/1974 | Swain ................................. 123/1 A |
| 3,818,875 | 6/1974 | Phillips et al. ..................... 123/25 E |
| 3,862,624 | 1/1975 | Underwood ............... 123/DIG. 12 |
| 3,946,711 | 3/1976 | Wigal ................................. 123/536 |
| 3,977,365 | 8/1976 | Vierling et al. ........................ 123/3 |
| 4,016,836 | 4/1977 | MacKay et al. ......................... 123/3 |
| 4,103,653 | 8/1978 | Ueno et al. ............... 123/DIG. 12 |
| 4,141,326 | 2/1979 | Wolber ..................... 123/DIG. 12 |

FOREIGN PATENT DOCUMENTS

| 2360568 | 6/1975 | Fed. Rep. of Germany . |
| 2525547 | 12/1976 | Fed. Rep. of Germany . |
| 2608044 | 9/1977 | Fed. Rep. of Germany . |
| 2808973 | 9/1979 | Fed. Rep. of Germany..123/DIG. 12 |
| 2327980 | 4/1977 | France . |
| 2419458 | 10/1979 | France . |
| 1513744 | 6/1978 | United Kingdom . |
| 1547344 | 6/1979 | United Kingdom . |
| 1561212 | 2/1980 | United Kingdom . |
| 1573601 | 8/1980 | United Kingdom . |
| 670739 | 6/1979 | U.S.S.R. . |

Primary Examiner—Charles J. Myhre
Assistant Examiner—E. Rollins Cross
Attorney, Agent, or Firm—Young & Thompson

[57] ABSTRACT

In fuel supply apparatus for an internal combustion engine, hydrogen gas is generated in a reaction vessel by the reaction of an alkali or alkaline earth metal with water and passes through a duct to the intake of the engine. A vacuum-operated non-return valve admits hydrogen gas from the reaction vessel to the duct when the pressure at the engine intake is less than the pressure in the reaction vessel. Air and optionally oxygen, also pass to the engine intake through respective ducts. A valve in each duct is interlinked with those in the other ducts and the valves control the flow of gas in the respective ducts so that the flow of hydrogen to the engine intake is in controlled proportion to the flows of air and oxygen.

12 Claims, 11 Drawing Figures

METHOD OF OPERATING AN I.C. ENGINE

The invention relates to fuel supply apparatus for an internal combustion engine, using hydrogen as a fuel and to a method of operating an internal combustion engine using hydrogen as a fuel. It is applicable to both vehicle and stationary engines but is particularly suitable for stationary engines.

In recent years, oil has predominated as the most widely used fuel for internal combustion engines, especially for automotive use. It was until recently relatively cheap. Apart from its rapidly escalating price its most significant other disadvantages are its inflammability, especially its lighter fractions, and its very considerable potential for causing pollution, both in its liquid or unburnt state and by virtue of the noxious products resulting from its combustion.

The three factors of exhaustion of supplies, increase in price, and environmental awareness, have caused attention to turn increasingly towards other fuels for the i.c. engine, or other means by which the internal combustion engine may be replaced. The former approach, i.e. the replacement of oil by other fuels, but retaining the internal combustion engine, with all the investment in facilities for manufacturing and maintaining it, is, at present at any rate, a more attractive option. One such approach is to use a gaseous fuel in i.c. engines, and of available fuels, hydrogen has the particular attraction that the specific power output of an engine using hydrogen as a fuel is high. There is a considerable body of literature relating to i.c. engines powered by hydrogen, the generation of hydrogen gas for use in engines, and the control of engine operation and gas generation. Many of these engines and methods of generation are of considerable complexity and there exists a need for a simple fuel supply apparatus, and a related method of operation, which will be capable of ready application in existing engines and installations, and which will be suitable for use in energy conversion apparatus using renewable energy sources to generate electricity.

According to the invention, fuel supply apparatus for an internal combustion engine comprises:
  means for generating hydrogen gas;
  a hydrogen duct for communicating between the hydrogen gas generating means and the intake of an internal combustion engine;
  an air duct for communicating between the atmosphere and the engine intake and/or an oxygen duct for communicating between an oxygen source and the engine intake;
  a vacuum-operated non-return valve for admitting hydrogen from the hydrogen gas generating means to the hydrogen duct when the pressure at the engine intake is less than the pressure in said means; and
  valve means in each of said ducts, each of which is adapted for controlling at least in part the flow of gas through the respective duct, and interlinked with the other or others of said valve means, so that flow of hydrogen gas through the hydrogen duct is controllable in proportion to the flow of air through the air duct and/or the flow of oxygen through the oxygen duct.

In use of the apparatus, it is preferred to supply only hydrogen and air to the engine, but supply of oxygen is optional for enhanced power output. For especially high outputs, the engine may be operated on hydrogen and oxygen, without air.

In a preferred embodiment, said means for generating hydrogen gas is adapted to generate hydrogen gas by the reaction of an alkali or alkaline earth metal with water, and may comprise a reactor vessel adapted to accommodate a quantity of an alkali metal or an alkaline earth metal and means for supplying water to said metal to generate hydrogen gas, said water supplying means being responsive to changes in pressure in the hydrogen duct.

The water supplying means may comprise a water vessel, and means for communicating between said water vessel and the reactor vessel for flow of water therethrough from said water vessel to the reactor vessel when the pressure in the reactor vessel is less than that in said water vessel. The means for communicating between said water vessel and the reactor vessel may comprise spray means disposed within the reactor vessel so that water flowing therethrough enters the reactor vessel in the form of a spray.

In the preferred embodiment, each said valve means comprises an element of a proportioning valve, and each of the valve elements of the proportioning valve comprises an apertured plate having a plurality of apertures in a portion thereof, and a masking plate having a window or windows therein, the window or windows having a total area at least equal to the area of said portion of the apertured plate, the masking plate and the apertured plate being movable relative to each other so that a selected number of the plurality of apertures may be aligned with the window or windows of the masking plate, each of said apertured plates having a different number of apertures, and the relative movement of the plates of each valve element being interlinked with the relative movement or movements of the plate or plates of the other or others of said valve elements so that the number of apertures of each apertured plate aligned with the window or windows of its corresponding masking plate is in a predetermined relationship with the number of correspondingly aligned apertures of the other or others of said apertured plates for each relative disposition of said plates.

The hydrogen duct may comprise a presetting valve disposed downstream of the non-return valve with respect to the engine intake.

Preferably all of said apertures are of the same size, but they may be of different sizes and/or shapes. In a particular embodiment, the hydrogen plate has 24 apertures, the air plate has 36 apertures and the oxygen plate has 12 apertures, all of the apertures being of the same diameter. In the starting configuration of the proportioning valve, 4 hydrogen apertures, no oxygen apertures and all 36 air apertures are uncovered. If running on full oxygen, all 24 hydrogen apertures, all 12 oxygen apertures, but no air apertures, are uncovered. It will be appreciated that other constructions of this valve may be provided, or that the aperture ratios may be different.

The proportioning valve serves to control at least in part the flow of hydrogen gas through the hydrogen duct in proportion to the flow of air through the air duct and/or in proportion to the flow of oxygen through the oxygen duct, the ratio of the quantity of hydrogen passing through the element of the proportioning valve in the hydrogen duct to the quantity of air and/or oxygen passing through the elements of the proportioning valve in the air and/or oxygen ducts respectively being determined at least in part by the number of apertures of the respective fixed plates aligned with the window openings of their corresponding movable masking plates. This ratio may be further controlled by the presetting valve, the presetting valve and the valve element of the proportioning valve in the hydrogen duct acting in series.

The ratio of oxygen to hydrogen may be maintained in accordance with the relationship required for satisfactory operation of the engine through the full range of positions of the movable plates.

The optimum percentage of hydrogen in a hydrogen-/air mixture for fuel is 29.5% hydrogen. However, a hydrogen/oxygen mixture will explode for any proportion of hydrogen between 15% and 85%. The combination of proportioning and presetting valves allows full advantage to be taken of this latitude throughout the operating range of the engine. In effect the range of the proportioning valve may be extended by governing at least the flow of hydrogen, and preferably also the flows of air and/or oxygen, by means of presetting valves. A particular function of the presetting valves is to ensure that hydrogen will be drawn into the apparatus during cranking for start-up. As soon as the engine fires, the presetting valves require further adjustment, since a start-up fuel mixture is too rich for normal running. The presetting valves are also operated to balance the flows when the engine is run on hydrogen and air without oxygen, or hydrogen and oxygen without air.

According to another aspect of the invention, a method of operating an internal combustion engine comprises the steps of:
  generating hydrogen gas by supplying water to a quantity of an alkali metal or alkaline earth metal;
  admitting the hydrogen gas to a hydrogen duct communicating with the intake of the engine through a vacuum-operated non-return valve;
  supplying air to the engine intake through a duct communicating between the atmosphere and the engine intake and/or supplying oxygen from an oxygen source to the engine intake through an oxygen duct communicating between said source and the engine intake; and
  controlling the flow of hydrogen gas through the hydrogen duct in proportion to the flow of air through the air duct and/or the flow of oxygen through the oxygen duct by valve means disposed in each of said ducts, each of which is adapted for controlling at least in part the flow of gas through the respective duct, and is interlinked with the other or others of said valve means.

A particular advantage of the method and fuel supply apparatus according to the invention resides in the use of gaseous rather than liquid hydrogen, thus reducing the problems of storing the hydrogen, and the weight of equipment required for this. Despite the volatility of hydrogen gas, since the hydrogen gas in the duct leading to the engine is at or below atmospheric pressure, the risk of a serious explosion due to blowback is minimised and additionally such danger may be further reduced by the provision of a side release on the vacuum valves, as described hereinafter.

The fuel supply apparatus may form part of an installation in which wind or water power is used to produce hydrogen or to produce a material such as an alkali or alkaline earth metal from which hydrogen may be evolved, thus providing a means for storing energy generated by renewable energy sources.

According to a further aspect of the invention, there is provided conversion apparatus comprising:
  a first electricity generator adapted to provide electrical energy from renewable energy sources for electrolysing the fused chloride of an alkali or alkaline earth metal and for selectively supplying an industrial or commercial load;
  fuel supply apparatus for an internal combustion engine as described hereinabove;
  an internal combustion engine adapted to drive a second electric generator for supplying said load; and
  means for treating the hydroxide of an alkali or alkaline earth metal with chlorine to produce the fused chloride of the metal; the arrangement being such that the first generator can supply said industrial or commercial load and electrolyse the fused chloride when energy is available from the renewable source, and hydrogen gas can be generated to drive said internal combustion engine to generate electricity to supply said load when sufficient energy is not available from the renewable source.

Means may be provided to recover heat released during the treatment of the hydroxide of the alkali or alkaline earth metal with chlorine and/or heat released during the generation of hydrogen gas in said fuel supply apparatus and/or waste heat carried by the exhaust gases of the internal combustion engine.

Other advantages and features of the invention will become clear from the following description of particular embodiments of the invention, in which reference is made to the accompanying drawings, of which.

Figure 1:
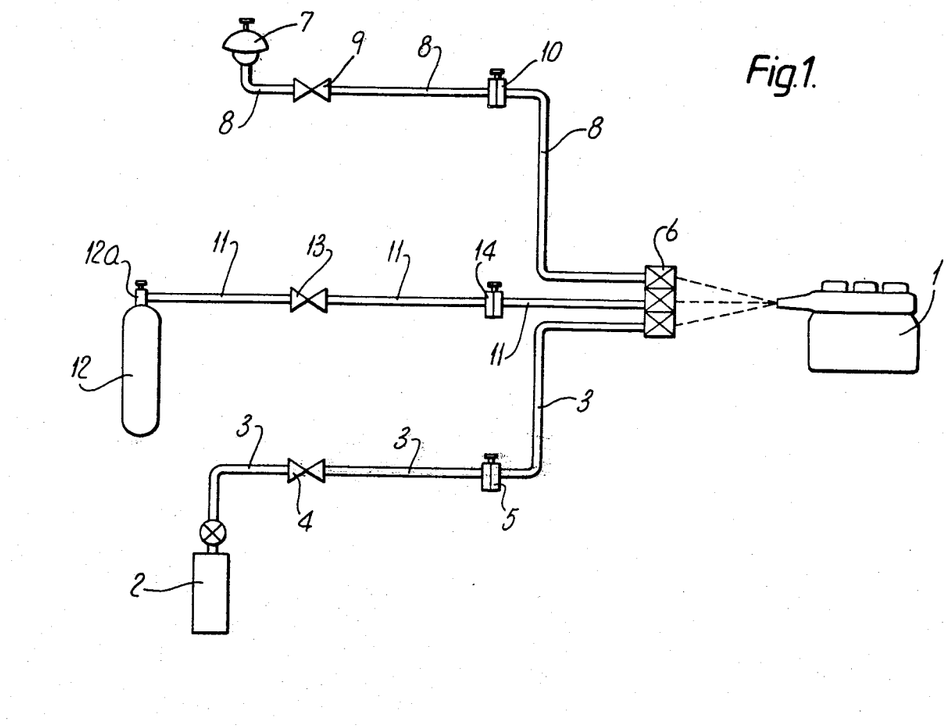
FIG. 1 is a schematic diagram of fuel supply apparatus for an internal combustion engine using hydrogen as a fuel.

As shown in FIG. 1, the intake of a spark-ignition internal combustion engine 1 is supplied with hydrogen in gaseous form evolved in a reactor 2, through a pipe or duct 3. Between the reactor 2 and the engine 1, there are located, in order from the reactor, a vacuum-operated non-return valve 4 with side release, a presetting valve 5 and a proportioning valve 6, each of which will be described hereinafter. In a preferred embodiment, the hydrogen is produced by direct evolution through the chemical reaction of an alkali metal or an alkaline earth metal with water or by electrolysis. In an alternative arrangement, the hydrogen may be supplied directly in gaseous form from a cylinder of pressurised hydrogen. The valve arrangements shown are not, however, changed in this event but a suitable cylinder is substituted for the reactor.

Air may be supplied to the intake of the engine 1 from an air intake filter 7, through the pipe 8, in which a vacuum-operated non-return side release valve 9, similar to the valve 4 in the hydrogen line 3, and a presetting valve 10 are located. The pipe 8 then leads from the presetting valve 10 to the proportioning valve 6. The valves are again hereinafter described.

An engine equipped with fuel supply apparatus according to the invention will operate satisfactorily on air alone, but additional power can be developed by the use of an additional oxygen supply. For convenience therefore, the engine will be described herein as operating with an oxygen supply as well as an air intake, but it will be appreciated that this is not an essential characteristic of the apparatus according to the invention. It will also be appreciated that in order to produce an especially high power output, the engine may be operated on hydrogen and oxygen alone.

Oxygen is supplied to the intake of the engine 1 from a pressurised cylinder 12, provided with a cylinder valve 12a, through a pipe 11. The arrangement is generally similar to that for the hydrogen and air and includes a vacuum-operated non-return side release valve 13 and a presetting valve 14. The pipe 11 then leads from the presetting valve 14 to the proportioning valve 6.

To admit gases to the fuel supply-apparatus from the reactor 2 and the cylinder 12, the apparatus is activated as hereinafter described and the cylinder valve 12a is opened. However, gas generated in the apparatus and released from the cylinder will not pass the valves 4 and 13 respectively unless the engine is in operation. Neither will air from the filter 7 pass the valve 9. The valves 4, 9 and 13 are vacuum-operated non-return valves, as described in connection with FIG. 3 and each has a side release or escape to cope with blowback from the engine. The term "vacuum-operated" as used herein in connection with the non-return valves, refers to the operation of such valves by the presence of a region of low pressure on their downstream sides. The low pressure required to operate these valves is provided by the piston of the engine on the intake stroke. Valves of this type are known in themselves; the operating parts of the valve element include a portion of large area on the low-pressure or vacuum side, and a portion of lesser area on the high-pressure side, whereby the desired mode of operation is obtained. The valves 4 and 13 also effectively function as pressure reducing valves for the slightly pressurised gas generated in the reactor and the high-pressure gas supplied by the cylinder 12. By virtue of this feature and the anti-blowback side release or escape provided on the valve, the danger of an explosion is reduced, since a blowback along the pipes from the engine intake will not reach the reactor apparatus or cylinder, and will affect only the very small amounts of gas at or below atmospheric pressure actually present in the portions of the pipes 3, 8 and 11 between the non-return valves and the engine.

Figure 3:
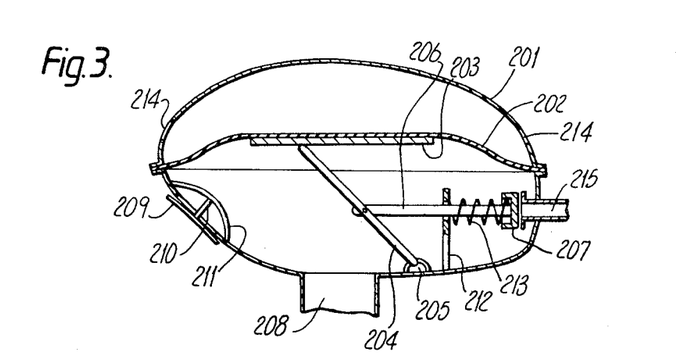
FIG. 3 is a diagram of a vacuum-operated valve for the apparatus of FIG. 1.

As shown in FIG. 3, a vacuum-operated non-return valve 4, 9 or 13 comprises a chamber 201 divided into two regions by a flexible diaphragm 202, the edge of which is secured to the wall of the chamber 201 in leak-proof manner. Preferably the chamber 201 has two parts which are clamped together to hold the diaphragm in position. The diaphragm carries a rigid plate 203 in a central portion thereof and the region above the diaphragm communicates with atmosphere through ports such as 214 in the wall of the chamber 201. The plate 203 engages the free end of a lever 204, the other end of which is pivoted at 205 to the wall of the chamber. The lever 204 is also pivoted to a shaft 206 which carries a closure member 207 adapted to close off the end of an inlet duct 215 when urged thereagainst. A spring 213 acting against a mounting member 212 fixed to the wall of the chamber serves to urge the member 207 to this closing position. When the plate 203 is moved downwardly, the lever 204 is pivoted so as to move the closure member 207 away from the inlet 215 against the pressure of the spring. The plate 203 is moved downwardly with the diaphragm 202 when a vacuum is communicated to the lower region of the chamber 201 through the outlet 208 so as to cause the diaphragm to move downwardly by the pressure of the atmosphere in the upper region of the chamber acting on the diaphragm. Manual operation (not shown) is also possible. It will be seen that since the area of the diaphragm is greatly in excess of the area of the closure member 207 engaging the inlet 215, a small degree of vacuum communicated to outlet 208 will move the valve closure member against the spring, whereas a high pressure acting on the small area at inlet 215 will be insufficient to open the valve. Thus the valve responds to a vacuum communicated from the engine manifold to draw gas in through inlet 215 to flow through the valve and out through outlet 208 to the engine. The side release element 209 consists of a rubber disc mounted on a stem 210 supported by a cross-piece 211 on the chamber wall so that if a pressure greater than atmospheric is communicated to the valve through the outlet 208 it is immediately relieved through the side release to atmosphere. It will be clear that no air will be admitted through this element during normal operation of the valve. It will also be clear therefore that the valve 4, 9 or 13 functions as a demand valve and that the degree to which it opens depends on the level of vacuum communicated to the lower region of the chamber 201 through the outlet 208. Thus the more gas is required by the engine, the greater the vacuum communicated and the greater the flow therethrough to the engine. It will also be clear that the valve is adapted to function satisfactorily with a wide range of inlet pressures at the inlet 215, and accordingly is suitable for use either with direct generation of hydrogen gas or with high pressure gas from a cylinder or other container.

It will also be clear that the side release of the valve provides for a high degree of safety in the system, in that it effectively prevents blowback from reaching the hydrogen or oxygen source. Since hydrogen is the lightest gas, any escape of hydrogen is also dissipated in the atmosphere at great speed, so that any potential danger rapidly passes away. In this respect, hydrogen is safer to use than petroleum fuels, any spillage of which presents considerable hazards for life and property.

It will be appreciated that since the opening operations of the valves 4, 9 and 13 are independent of the pressures upstream from them, the actual pressures upstream of the valves are not important. Thus, air at atmospheric pressure is drawn into the pipe 8, similarly to the way in which the slightly pressurised hydrogen and the higher pressurised oxygen are drawn into the pipes 3 and 11. It will be appreciated that when a pressurised cylinder for the direct supply of hydrogen gas is substituted for the reactor 2, the operation of the fuel supply apparatus is substantially unaltered.

It will also be appreciated that the particular construction of the valves 4, 9 and 13 described hereinabove provides for the admission of gas through the inlet 215 when the pressure communicated to the outlet is less than atmospheric. However, it will be clear that the valve can be modified, or an alternative construction provided, in which the pressure communicated to the outlet exceeds atmospheric, and that for the flow of gas, for example hydrogen, through the valve to the engine intake, all that is necessary is that pressure communicated to the outlet 208 should be less than that present at the inlet. The arrangement described has particular advantages, however, in that it provides added safety by virtue of the simple means for side release of gas to atmosphere in the event of blowback.

The valves 5, 10 and 14 are presetting valves and are adjusted to control the vacuum applied to each of the valves 4, 9 and 13 when the proportioning valve 6 is set for starting, as will be hereinafter described. These valves also fulfil a flow control function, and are used in conjunction with the proportioning valve in the running condition of the engine, as will also be hereinafter described. It is preferred that these valves should be separate from the other valves of the apparatus, namely the non-return valves 4, 9 and 13, and the proportioning valve 6. The presetting valves are shown located between the non-return valves and the proportioning valve, but they could also be positioned on the engine intake side of the proportioning valve. In the present description, the presetting valves are referred to and shown as being arranged for continuous stepless variation of the opening thereof but in an alternative embodiment, stepwise opening of these valves is possible.

Figure 2:
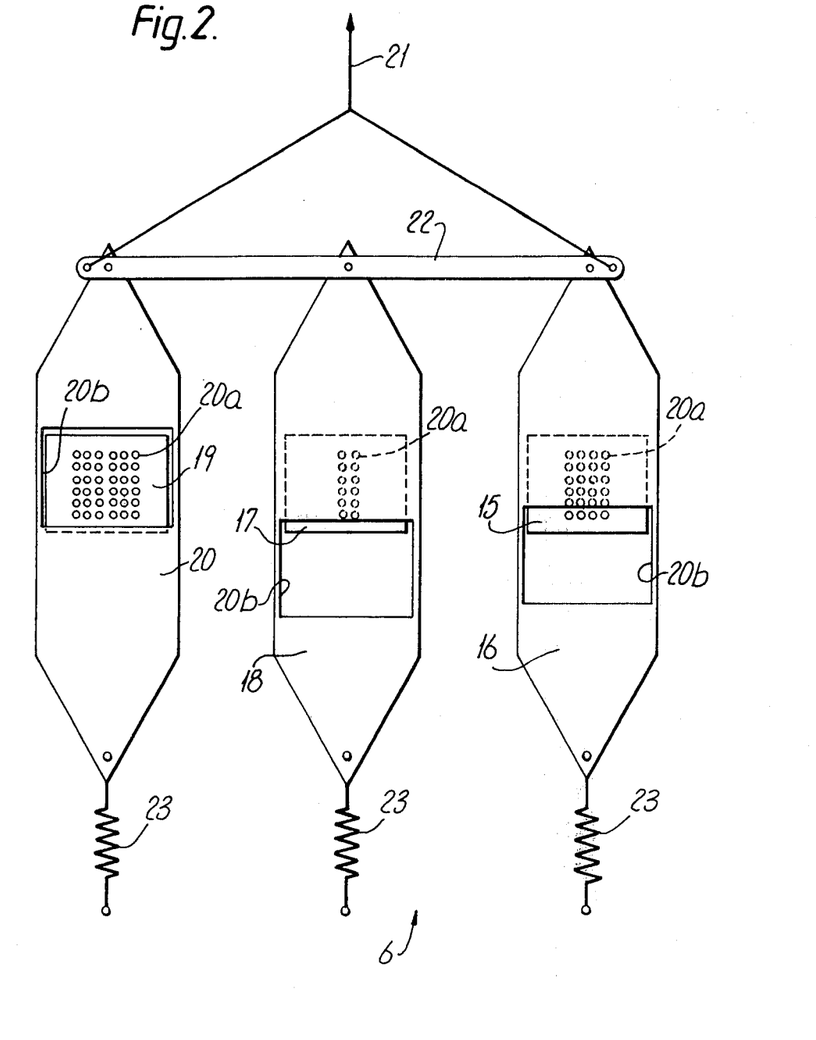
FIG. 2 is a diagram of a proportioning valve for the system of FIG. 1.

The proportioning valve is shown in diagrammatic form in FIG. 2. It is a plate type valve and has three elements. Each element is associated with one of the pipes 3, 8 and 11, and thus handles hydrogen, oxygen air respectively. Each element consists of a fixed plate 15, 17, 19 and a movable or front plate 16, 18, 20. The three movable plates are connected so that they move together. Each fixed plate 15, 17, 19 is provided with an array of holes 20a through which gas may pass. The number of holes in each of the fixed plates is different but the holes in all three plates are of the same size. Each movable plate 16, 18 and 20 is provided with a larger aperture or window 20b and according as the movable plate 16, 18 and 20 is moved relative to the corresponding fixed plate 15, 17 and 19, the holes 20a may be exposed or occluded to any required degree. Each of the windows 20b has a larger area than the area of the respective fixed plate 15, 17, 19 containing the array of holes 20a, so that all of the holes 20a in each fixed plate can be exposed. The valve elements thus control, in a precise manner, the quantities of gas and air flowing through them. The plates 15 and 16 control the flow of hydrogen, the plates 17 and 18 that of the oxygen, and the plates 19 and 20 the flow of the air. It will be seen from FIG. 2 that for every four holes 20a in the hydrogen plate 15, there are two holes in the oxygen plate 17 and six in the air plate 19, thus determining the balance between the three flows for each position of the movable plates, when the settings of the presetting valves are held constant.

In the starting position, which is shown in FIG. 2, all the air holes are open, all the oxygen holes are closed off, and some of the hydrogen holes are open.

The three movable plates are operated by a single cable 21 connected to a bar 22 to which the plates 16, 18 and 20 are coupled. Springs 23 are attached to the lower ends of the plates 16, 18 and 20 to urge the plates towards the starting configuration shown. The cable 21 is coupled to the engine throttle control.

One function of the presetting valves is to ensure that hydrogen will be drawn past the non-return valve 4 under these start-up conditions. Without the presetting valves, the vacuum in the duct 3 would not be sufficient to cause the non-return valve to open, since the area of the proportioning valve open to air flow is so much greater than that provided for the flow of hydrogen under these starting conditions.

Accordingly, the air presetting valve 10 is opened to a small extent and the hydrogen presetting valve 5 is opened to a larger extent. Thus hydrogen is sucked into the fuel supply apparatus, when the engine is turned over, which may be by hand cranking or by an electric starter motor in conventional manner.

As soon as the engine fires, the presetting valves require further adjustment, since the mixture is now too rich in hydrogen for normal running. Thus the air presetting valve is opened more widely, or the hydrogen presetting valve is partly closed off, or both valves are simultaneously adjusted.

To move away from the starting configuration, the movable plates are moved upwards by means of the cable 21, so that the air holes are gradually closed off and the oxygen holes and more of the hydrogen holes are opened. As the plates are moved upwards to a greater extent, the hydrogen and oxygen holes are opened to a greater degree, while the air holes are increasingly closed off. Thus more hydrogen and oxygen pass to the engine intake and less air. By allowing more hydrogen to reach the engine intake, the speed and power output of the engine are increased. To operate the engine on hydrogen and air only, without oxygen, the oxygen presetting valve 14 may be fully closed, and the proportioning valve operated in a similar way to that employed when oxygen is being used along with air. However, when oxygen is in use, either alone or with air, more hydrogen can be taken into the cylinder or cylinders of the engine than when the hydrogen is used with air alone, giving greater power and greater acceleration.

It will again be appreciated that additional adjustment of the presetting valves may also be carried out during running. Accordingly the proportioning valve determines the ratio of hydrogen to oxygen in the mixture of hydrogen and/or air when the settings of the presetting valves are held constant, but adjustment of the degree of opening of these valves allowa a further level of control of the quantities of these gases passing through the fuel supply apparatus.

It is also envisaged that the function of the presetting valves could be combined with that of the proportioning valve. Alternatively, presetting valves suitable for stepwise operation and provided with arrays of apertures similar to the arrangements described for the proportioning valve may be employed. In a suitable embodiment, the presetting valves would be moved to a start-up position until the engine fired and then into an idling position as soon as it fired. A third position of the valves would be an accelerating and/or running position.

A proportioning valve of the type herein described is precisely controllable to regulate the amounts of hydrogen and air and oxygen admitted to the engine. The degree of controllability is found to be superior to that obtainable with gate or needle type valves when dealing with gas flows. In addition the valve has the further merits of simplicity and ease of manufacture. However, it will be appreciated that the interlinking of the elements of the proportioning valve may be achieved by means other than the mechanical construction described. In particular the elements of the valve may be interlinked by electronic means adapted to control the respective flows of gas in the various ducts in the required proportions.

It will be realised that the proportioning valve cannot be opened to its fullest extent when running on hydrogen and air only, since the hydrogen/oxygen ratio would not be maintained within the required limits, unless the presetting valves are also adjusted. It will also be realised that the degree of opening of the proportioning valve also affects the level of vacuum applied to the valves 4, 9 or 13, and thus also determines the demand for the gases at these valves, within the overall demand created at the engine intake. As more of the holes in the plates are uncovered, the level of the vacuum at the valves 4, 9, 13 is increased.

It will be appreciated that the engine itself is not radically changed from its configuration when using oil as a fuel. The carburettor is removed and replaced by the hydrogen/oxygen/air supply apparatus described hereinabove, but the ignition system, including the spark plugs and associated electrical equipment, and the valve system of the engine proper are unaltered in principle although it may be necessary to make adjustments in the engine timing and/or valve settings. It is envisaged that an engine equipped with fuel supply apparatus according to the invention would be particularly suitable for an electronic timing system.

It will also be appreciated that the particular arrangements of mechanical valves directly operated by mechanical means could be replaced by motor valves under the control of an electronic processing unit in situations where this would be advantageous.

In the preferred embodiment, hydrogen for use in the method of the invention is produced by the reaction of an alkali or alkaline earth metal with water. In an alternative embodiment the hydrogen may be produced by electrolysis, and in this instance, oxygen is also produced.

Figure 4:
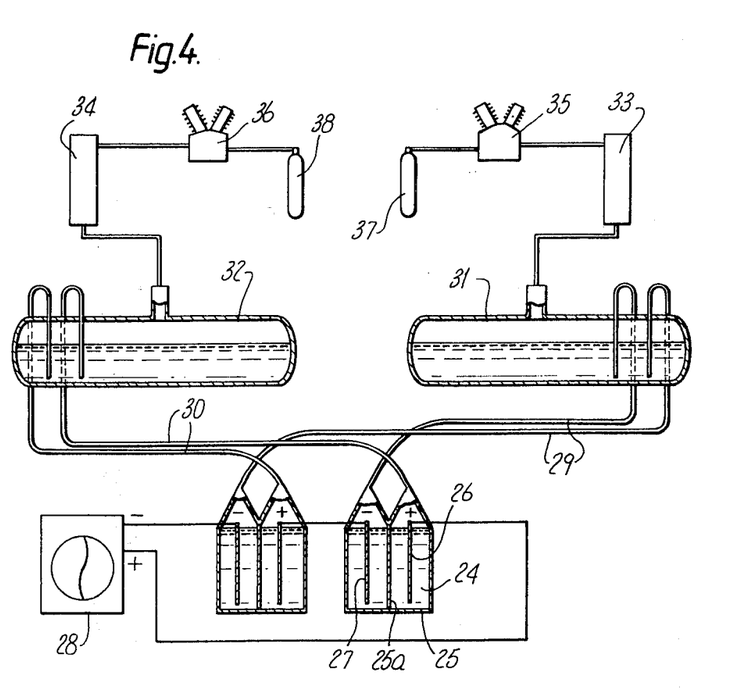
FIG. 4 is a schematic diagram of apparatus for producing hydrogen and oxygen by electrolysis.

Describing this latter arrangement first, as shown in FIG. 4, a potassium hydroxide solution 24 is electrolysed in a series of cells 25, the positive and negative plates 26 and 27 respectively of the cells being stainless steel and of sufficient area to reduce the resistance of the cells to a practical minimum. The cells are fed by a d.c. source 28. The voltage drop across each cell is slightly in excess of two volts. Accordingly, if a 220 V. d.c. supply of 2 kW is used, 110 cells are required. Such an installation could theoretically produce 11000 liters of hydrogen in 24 hours, and 5000 liters of oxygen could be produced at the same time. Each cell is divided by an asbestos wall 25a, the positive electrode being on one side thereof and the negative electrode on the other side. The hydrogen comes off the solution in that section of the cell containing the positive electrode and the oxygen in the section containing the negative electrode. Pipes 29 carry the hydrogen to a tank 31 where it is collected over water. It then passes through a dryer 33 and is compressed for storage in a cylinder 37, for later use as fuel for an internal combustion engine according to the method of the invention. The oxygen is similarly taken through pipes 30 to a tank 32 for collection over water, following which it is dried in a dryer 34 and compressed by a compressor 36 for storage in a cylinder 38, again for use with an i.c. engine as hereinabove described. Alternatively, hydrogen and oxygen produced by electrolysis may be used directly in an i.c. engine, without the intermediate stage of cylinder storage.

The preferred method of producing hydrogen for operating an internal combustion engine according to the method of the invention is by using the chemical reaction between an alkali metal or an alkaline earth metal and water. In this case the reaction between the water and the alkali metal or alkaline earth metal liberates the hydrogen, but oxygen gas is not produced, unlike the electrolysis method described hereinabove. In the case of alkaline earth metals, the water may require to be heated.

Figure 5:
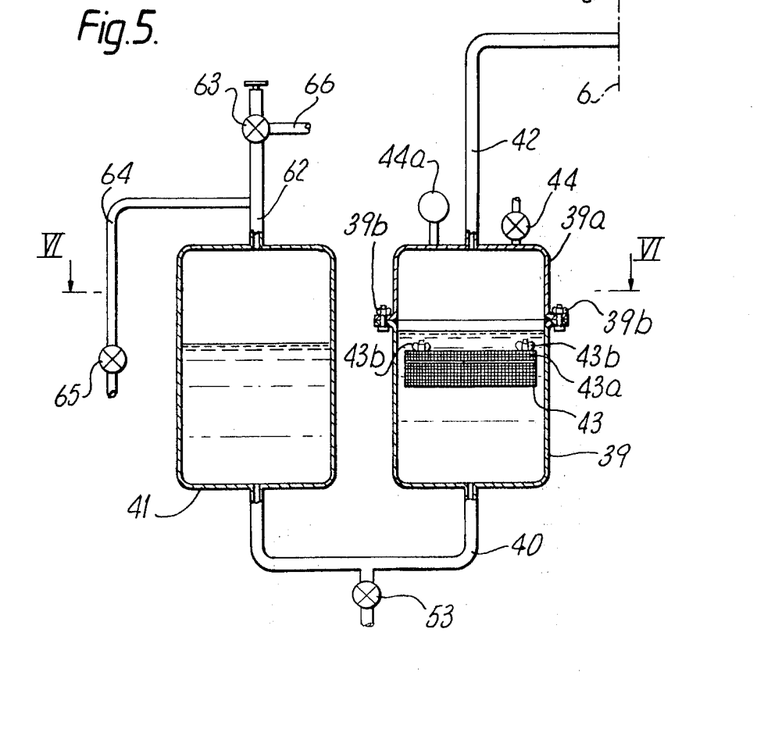
FIG. 5 is a schematic section on the line V—V of FIG. 6 showing an embodiment of a reactor for producing hydrogen by reaction of water with an alkali or alkaline earth metal.
Figure 6:
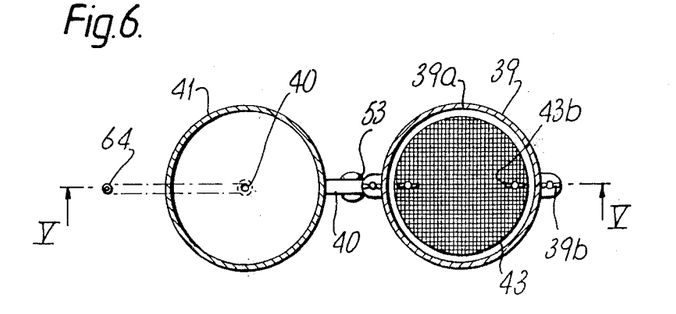
FIG. 6 is a section of the reactor of FIG. 5 on the line VI—VI of FIG. 5.

An embodiment of the reactor 2 of FIG. 1 is shown in FIGS. 5 and 6. A vessel 39, provided with a water pipe 40 connecting it to a further vessel 41 and having a hydrogen outlet 42, contains a stainless steel wire mesh cage 43 within which a portion of an alkali metal or an alkaline earth metal may be placed. The cage 43 has a removable top 43a secured by wing nuts 43b. The cage 43 is suitably located approximately midway between the top and bottom of the vessel 39. Suitably the vessel 39 may be substantially cylindrical and its top portion 39a is removable to give access to the cage 43. The top portion of the vessel is also secured in position by wing nuts 39b, and includes a safety valve 44, and a pressure gauge 44a. The further vessel 41 is also preferably cylindrical, and is closed, apart from an outlet/inlet pipe 62 which ends at an adjustable pressure release valve 63 and has a branch pipe 64 ending at a non-return valve 65 adapted to admit air and/or water to the pipe 64 and vessel 41.

The operation of the reactor will now be described. The vessels 39 and 41 are initially empty of water so that the vessl 39 can be opened, the stainless steel wire mesh cage also opened and the alkali metal or alkaline earth metal placed within the cage. The top portion of the cage is then re-secured using the wing nuts 43b and the top portion of the vessel 39 is similarly set back in place and fastened in position by means of the wing nuts 39b. The hydrogen outlet is connected to the intake of an internal combustion engine via the pipe 3 of FIG. 1, through the non-return valve, the presetting valve and the proportioning valve. The vessels 39 and 41 are then charged with water.

The level of the water in the vessel 41 is controlled by the setting of the pressure release valve 63, which thus also controls the water level in the vessel 39, since the two vessels are connected by the pipe 40. When the water level in the vessel 39 rises, the water comes into contact with the alkali metal or alkaline earth metal within the cage 43.

The result of this is a very rapid evolution of hydrogen. It is necessary that the production rate of the hydrogen exceeds the rate of its usage by the engine, and in order to control the rate of evolution of the hydrogen, the reactor works as follows. As hydrogen is produced, gas pressure builds up in the vessel 39 and pushes down the level of the water therein. When the level drops below that of the alkali or alkaline earth metal, the production of hydrogen ceases. This fall of level in the vessel 39 is partly compensated by a rise in the water level in the vessel 41 and partly by water being consumed in producing the hydrogen. The relative sizes of the vessels 39 and 41 and the setting of the valve 63 are chosen so that hydrogen production will cease at a specified pressure of hydrogen in the vessel 39. As the water level in the vessel 41 rises, the air above it is compressed. If the air pressure exceeds the setting of the valve 63, the pressure is relieved by the valve. Air blowing off from valve 63 may be led away through a branch pipe 66 which may exhaust to atmosphere, or over a water tray or vessel.

According as the engine uses the hydrogen produced in the vessel 39 and the hydrogen is consumed, the pressure in the vessel 39 falls. With the drop in pressure, the water level can rise again in the vessel 39, as explained below, so that the water again comes into contact with the metal in the cage, and more hydrogen is given off.

The non-return valve 65 at the end of the branch pipe 64 allows the water level in the vessel 39 to rise, by admitting air to the vessel 41 above the level of the water in that vessel, when the pressure above the water in the vessel falls below atmospheric.

In order to "top up" the water in the vessels 39 and 41, or to reintroduce condensed water from the engine exhaust in a closed system, the non-return valve may be arranged to be below, at least some of the time, the surface of water or condensate in a suitable tray or vessel, so that the water or condensate is sucked into the vessel 41 by a negative pressure therewithin. To guard against loss of water when the system is closed, the branch pipe 66 may also end above the tray so that any water expelled from the vessel 41 during the evolution of hydrogen in vessel 39 can be returned to be taken into the vessel again when there is a negative pressure within it.

Figures 7, 9:
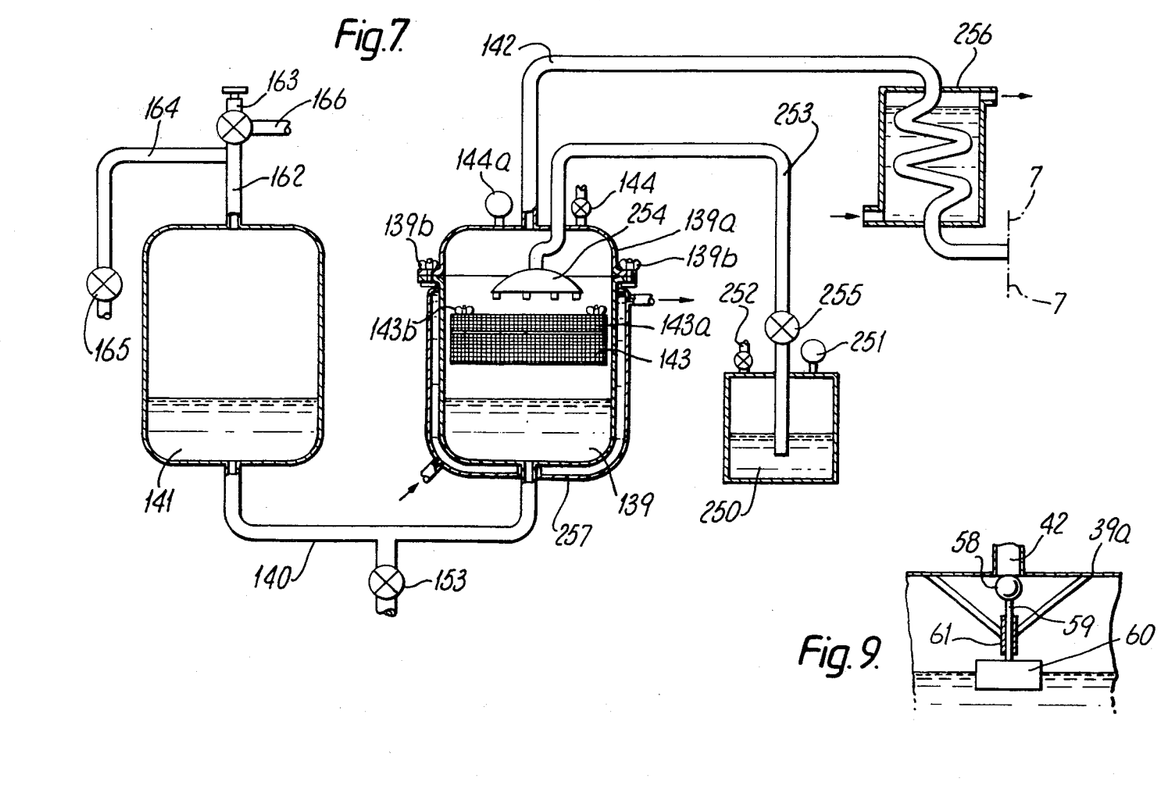
FIG. 7 is a schematic sectional elevation similar to FIG. 5 showing another embodiment of a reactor for producing hydrogen by reaction of water with an alkali or alkaline earth metal, which can be substituted for the reactor of FIG. 5 in fuel supply apparatus according to FIG. 1.
FIG. 9 shows in section a non-return valve for the hydrogen outlet from the reaction vessel of FIGS. 5 or 7 to prevent liquid entering the gas line.

An alternative embodiment of the reactor 2 is shown in FIG. 7. The arrangement is in many respects similar to that of FIGS. 5 and 6 but the hydrogen is evolved by spraying water onto the alkali or alkaline earth metal contained in the cage, rather than by immersing the metal in water, as is the case in the previously described embodiment. Those items in FIG. 7 which are substantially identical with items in FIGS. 5 and 6 are distinguished by the use of the same identifying numerals, with the addition of one hundred in each case.

As shown in FIG. 7, a pressure vessel 250 contains water and is charged to an outlet pressure determined by the pressure which the spray is required to overcome in the vessel 139. The vessel 250 is provided with a pressure gauge 251 and an inlet 252, through which it may be charged with water and pressurized. Instead of the pressure vessel 250, a pump may be used, which is adjusted and controlled to feed water at a predetermined pressure to the vessel 139. A pipe 253 connects the pressure vessel 250 to the vessel 139, where it terminates in a nozzle device 254, adapted to spray water received through the pipe under pressure from the pressure vessel 250, onto the alkali or alkaline earth metal contained in the cage 143. A valve 255 in the pipeline 253 controls the flow of water through the pipe. When the valve 255 is opened, water flows from the vessel 250, since the vessel is under pressure, and the end of the pipe 253 within the vessel is below the water level. The water sprays onto the metal in the cage, hydrogen is generated and pressure is immediately built up in the vessel 139. When the gas pressure in the vessel 139 becomes equal to or exceeds the water pressure at the nozzles of devices 254, the water stops flowing into the reactor vessel 139. As the engine runs, and hydrogen is withdrawn from the vessel 139, the pressure in this vessel again drops, so allowing water to once more spray onto the metal and again build up gas pressure in the vessel 139. Thus hydrogen is produced only on demand by the engine.

As shown in FIG. 7, the vessel 139 contains a body of water and is connected by pipe 140 to the vessel 141, similar to the arrangement shown in FIG. 5. While the presence of water in large quantity in the vessel 139 is not essential with the spray arrangement of FIG. 7, a certain amount is required in order to dilute the concentrated hydroxide resulting from the reaction vessel of metal and the water. The operating pressure of the vessel 139 is low, and may be of the order of five to ten psi. Actual operating pressures will depend on the design of the reactor vessel and the hydrogen demand. This embodiment of the reactor facilitates control of the rate of evolution of the hydrogen, which is especially advantageous in situations where demand varies rapidly.

The evolution of the hydrogen in the reactor is accompanied by the generation of a considerable amount of heat. Thus it is advantageous to include a condenser cooled by water in the line 142 leading from the vessel 139. As will be described below, the condenser is followed by a water trap. The condenser includes a coil through which the gas passes and a water jacket and is of known design which will not be described further. Advantageously, a water jacket 257 is also provided on the vessel 139. As also described hereinafter, the exhaust line from the engine may also include a water cooler, so that the heat from all of these jackets and coolers may be collected in a single hot water circuit. In this circumstance the water from the condenser 256 is first directed to the exhaust gas cooler and thereafter to the cooling jacket on the reactor vessel 139. In the case of a stationary engine, the heat may be used for space heating or for supplying hot water. With mobile or vehicle engines, the heat can be liberated in the form of steam, and may possibly be used to drive a small turbine.

The alkali metal or alkaline earth metal may, in addition to the cage arrangements described above or in part replacement of them, be fully encased in a water soluble material or encased in a material insoluble in water but having holes in it to admit water to the metal encased. By this means an additional or alternative control may be imposed on the rate at which the hydrogen gas is evolved.

The hydrogen evolved may be stored, if desired, instead of being supplied direct to an internal combustion engine.

Figures 8, 10, 11:
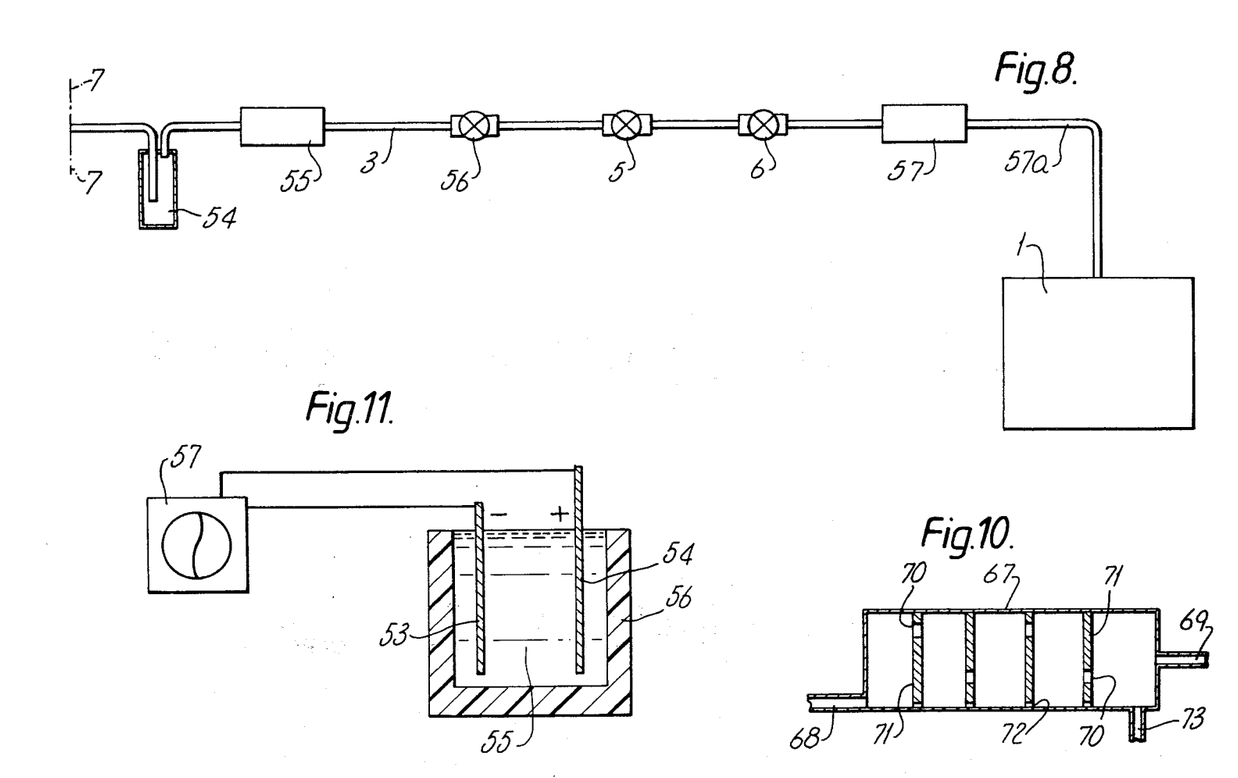
FIG. 8 shows the continuation of the hydrogen supply line from the reaction vessel of FIGS. 5 or 7 to an internal combustion engine.
FIG. 10 is a longitudinal schematic section through a condenser for use in the exhaust of an internal combustion engine supplied with hydrogen by the apparatus of FIG. 1.
FIG. 11 is a schematic diagram showing apparatus for producing an alkali metal or an alkaline earth metal by electrolysis of a fused chloride.

FIG. 8 shows a modified version of the hydrogen line 3 of FIG. 1 continuing from the line 6—6 in FIG. 5 or the line 7—7 in FIG. 6. In this case the line includes various elements not included in FIG. 1, mainly directed towards drying of the hydrogen en route to the engine 1. From the outlet 42 of vessel 39 in FIG. 5, or from the condenser 256 of FIG. 7, the hydrogen passes through a trap 54, intended to remove water from it, and then through a dryer 55, which contains a quantity of dessicating material. Valve 56 is a vacuum operated side release safety valve and is followed by the presetting valve 5 and the proportioning valve 6 as shown in FIG. 1. FIG. 8 only shows the hydrogen line 3 to the proportioning valve 6 but it will be understood that there are also oxygen and air feeds to valve 6 and that the line 57a leading from the proportioning valve to the engine 1 carries not only hydrogen but also air and/or oxygen. 57 represents a further dryer also containing a quantity of desiccant for further drying the combined gas flow between the proportioning valve and the engine. With high compression ratio engines, it may be preferable to omit the dryers 55 and 57, as very dry gas can result in the emission of the pollutant nitric oxide. Thus the presence of a quantity of moisture may be preferable.

FIG. 9 shows one form of non-return valve for preventing carry-over of water from the vessel 39 of FIG. 5 into the line 3 which can occur in operation of the engine in the event of a sudden surge or demand for gas. A ball valve element 58 is mounted on a rod 59 extending from a float element 60 on the surface of the water in the vessel, and is guided and restrained in vertical movement towards and away from the outlet 42 by guides 61. Thus if the water level rises beyond a predetermined amount, the ball 58 closes off the outlet 42 and stops flow of gas until the surge has ceased. In this way the line 3 and the valve associated with it are protected from flooding and possible damage by the water.

It will be appreciated that FIGS. 8 and 9 represent only one method of embodying the features shown therein and that other equivalent means may be employed within the scope of the invention.

A further safety feature is shown in FIG. 6 in the form of valve 53 in the pipe 40 connecting the vessels 39 and 41. This valve serves to drain the water from the reactor vessels when it is not desired to generate hydrogen and it may lead to a drain compartment or vessel for the water. It also fulfills a safety function in that it can act as a dump valve to drain the reactor vessels rapidly in the event of any untoward circumstance which requires urgent cessation of the evolution of hydrogen. It can thus be coupled to an emergency button or lever available to the operator or driver.

A similar safety feature can be included in the reactor of FIG. 7 for rapid release of the pressure in the vessel 250.

In another feature of the fuel supply apparatus, water in the exhaust from the engine can be condensed and the condensed water directed back to the vessel 41 or 141 so that the water system of the reactor is closed, and the water in it is continuously recycled. The condensate can be pumped back to the vessel 41 or 141 or can flow under gravity if the condenser is disposed at a higher level than the vessel. The exhaust line condenser may additionally serve to clear the exhaust more effectively by causing a relative vacuum in the exhaust line.

FIG. 10 shows a suitable form of exhaust line condenser. The exhaust gases enter condenser 67 via inlet 68 and flow through it to outlet 69. On the way they pass through holes 70 in baffles 71 disposed transversely across the condenser. The holes 70 are disposed either in the upper or lower part of each baffle, each baffle with the holes 70 in its upper part being followed by one with the holes in its lower part, so as to promote condensation of water vapour in the exhaust. Each baffle 71 also has an opening 72 at its bottom part to allow condensed water vapour to flow to a condensate outlet 73.

It is a further advantage of the reactor illustrated in FIGS. 5 or 7 that the alkali and alkaline earth metal used in the evolution of the hydrogen may be regenerated for further use. The end result of the operations described in relation to FIGS. 5 or 7 is a solution of the hydroxide of the alkali or alkaline earth metal, which may go as high as 85% in strength before its replacement becomes necessary. The solution can be treated with chlorine gas to produce the chloride of the alkali or alkaline earth metal from which the metal itself may be recovered. It is a further advantage that heat evolved during the treatment of the hydroxide may be used at other stages of the process, thereby improving the overall efficiency.

FIG. 11 shows a system for producing an alkali metal or alkaline earth metal, by electrolysis of the fused chloride of the metal required, with small quantities of another alkali or alkaline earth metal chloride added in order to reduce the melting point.

A cathode 53 of iron and an anode 54 of carbon are used, and are placed in the fused chloride 55 to which is added the other alkali or alkaline earth metal chloride. The mixture is contained in a heated and insulated vessel 56 and a d.c. source 57 is placed across the electrodes. The production of alkali or alkaline earth metals in this way is well known.

Both the electrolysis method of generating hydrogen and the system involving the use of an alkali or alkaline earth metal are envisaged as suitable for use in conjunction with electricity generation using renewable sources of energy, e.g. wind, small scale water generation, and solar voltaic cells. A major disadvantage of renewable energy sources is the difficulty of storing surplus energy, e.g. energy collected by a solar panel on a hot sunny day, for use on subsequent occasions, e.g. on a cold day. The most commonly used known method is by means of storage batteries, but this is cumbersome, expensive and not wholly satisfactory. The apparatus and method described herein allow the conversion of such surplus energy into hydrogen which may then be used as a fuel for known internal combustion engines, either immediately or on some later occasion, thus providing convenient and safe storage of the energy.

The surplus energy generated may be used for the electrolysis of, for example, potassium hydroxide to produce hydrogen and oxygen gas directly, for immediate use or for storage under pressure or the energy may be used for electrolysis of fused chlorides to produce alkali or alkaline earth metals for later use to produce hydrogen for direct use in an engine. Hydrogen produced may be stored in cylinders as described or may be stored in other means, e.g. under a bell, from which it may be drawn to run an i.c. engine for generating electricity when weather conditions prevent energy being drawn from the renewable resource, e.g. the wind or the sun.

In another arrangement, a rennewable energy generator, such as a windmill may be used to supply power and regenerate alkali metal. When the wind stops blowing, the alkali metal may be used to produce hydrogen to drive an engine as described hereinabove. Thus the method and apparatus of the invention provide an integrated energy generation and energy storage system of a simple and advantageous kind.

In a known arrangement with a wind generator, the wind generator operates with a diesel generator, the latter compensating for the fluctuations in output resulting from changing wind conditions. Using the apparatus according to the invention, the wind generator can be deployed for regenerating the alkali or alkaline earth metal only, and power can be generated by the hydrogen gas produced by the reaction of the metal and water. Thus the load fluctuation problems are avoided.

It is a further advantage of the alkali or alkaline earth metal method that the alkali or alkaline earth metal used in the evolution of the hydrogen may be regenerated for further use. The end result of the operations described in relation to FIGS. 5 or 7 is a solution of the hydroxide of the alkali or alkaline earth metal. This can be then treated by chlorine gas to produce the chloride of the alkali or alkaline earth metal. Since chlorine gas is given off at the carbon anode 54 in the system of FIG. 11 during the production of the alkali or alkaline earth metal from the fused chloride thereof, this system may suitably be employed in conjunction with the regeneration of the metal from a hydroxide solution. Furthermore, oxygen is a by-product of this treatment of the hydroxide with the chlorine gas, and this oxygen can, of course, also be used in the method of the invention.

Thus waste in the system is reduced, and the advantages are enhanced when the necessary energy input is obtained from a renewable resource.

A suitable alkali metal is lithium, which is available in reasonable abundance. However, since it will be continually recycled and serve as an energy carrier, rather than as a consumable material, its relative scarcity or abundance is not of prime importance. It has the particular advantage that it is relatively non-inflammable in air, unlike sodium and potassium which are thus more difficult to handle.

It will be appreciated that the descriptions of particular embodiments hereinabove are by way of example only, and that the invention extends to all embodiments or methods within the scope of the appended claims.

I claim:

1. Fuel supply apparatus for an internal combustion engine comprising:
   (a) means for generating hydrogen gas comprising
      (i) a reactor vessel adapted to accommodate a quantity of an alkali metal or an alkaline earth metal, and
      (ii) means for supplying water to said metal to generate hydrogen gas by the reaction of said metal with water, said water supplying means being responsive to changes in gas pressure in said reactor vessel;
   (b) a hydrogen dust for communicating between the reactor vessel and the intake of an internal combustion engine;
   (c) an air duct for communicating between the atmosphere and the engine intake and/or an oxygen duct for communicating between an oxygen source and the engine intake;
   (d) a vacuum-operated non-return valve for admitting hydrogen from the reactor vessel through the hydrogen duct when the pressure at the engine intake is less than the gas pressure in said reactor vessel; and
   (e) valve means in each of said ducts, each of which is adapted for controlling at least in part the flow of gas through the respective duct, and is interlinked with the other or others of said valve means, so that flow of hydrogen gas through the hydrogen duct is controllable in proportion to the flow of air through the air duct and/or the flow of oxygen through the oxygen duct.

2. Fuel supply apparatus according to claim 1, wherein said water supplying means comprises a water vessel and means for communicating between said water vessel and the reactor vessel for flow of water therethrough from said water vessel to the reactor vessel when the gas pressure in the reactor vessel is less than that in said water vessel.

3. Fuel supply apparatus according to claim 2, wherein said means for communicating between said water vessel and the reactor vessel comprises spray means disposed within the reactor vessel so that water flowing therethrough enters the reactor vessel in the form of a spray.

4. Fuel supply apparatus according to claim 1, wherein each said valve means comprises an element of a proportioning valve.

5. Fuel supply apparatus according to claim 4, wherein each of the valve elements of the proportioning valve comprises an apertured plate having a plurality of apertures in a portion thereof, and a masking plate having a window or windows therein, the window or windows having a total area at least equal to the area of said portion of the apertured plate, the masking plate and the apertured plate being movable relative to each other so that a selected number of the plurality of apertures may be aligned with the window or windows of the masking plate, each of said apertured plates having a different number of apertures, and the relative movement of the plates of each valve element being interlinked with the relative movement or movements of the plate or plates of the other or others of said valve elements so that the number of apertures of each apertured plate aligned with the window or windows of its corresponding masking plate is in a predetermined relationship with the number of correspondingly aligned apertures of the other or others of said apertured plates for each relative disposition of said plates.

6. Fuel supply apparatus according to claim 1, wherein vacuum-operated non-return valves are provided in the hydrogen duct, the air duct and/or the oxygen duct and the respective vacuum-operated non-return valve admits hydrogen, air or oxygen through the respective duct when the pressure at the engine intake is less than atmospheric pressure.

7. Fuel supply apparatus according to claim 6, wherein each of the vacuum-operated non-return valves is provided with an escape element communicating to atmosphere to relieve excess pressure in the respective duct between the said valve and the engine intake.

8. Fuel supply apparatus according to claim 2, wherein the water vessel is provided with a pressure-release valve.

9. Fuel supply apparatus according to claim 2, wherein the water vessel is provided with a non-return valve to admit air and/or water to the water vessel when the air pressure in the water vessel falls below atmospheric pressure.

10. Fuel supply apparatus for an internal combustion engine comprising:
   (a) means for generating hydrogen gas;
   (b) a hydrogen duct for communicating between the hydrogen gas generating means and the intake of an internal combustion engine;

(c) an air duct for communicating between the atmosphere and the engine intake and/or an oxygen duct for communicating between an oxygen source and the engine intake;

(d) a vacuum-operated non-return valve for admitting hydrogen from the hydrogen gas generating means to the hydrogen duct when the pressure at the engine intake is less than the pressure in said means; and (e) valve means in each of said ducts, each of which is adapted for controlling at least in part the flow of gas through the respective duct, and is interlinked with the other or others of said valve means, so that flow of hydrogen gas through the hydrogen duct is controllable in proportion to flow of air through the air duct and/or flow of oxygen through the oxygen duct, each valve means comprising an element of a proportioning valve and each said valve element comprising an apertured plate having a plurality of apertures in a portion thereof, and a masking plate having a window or windows therein, the window or windows having a total area at least equal to the area of said portion of the apertured plate, the masking plate and the apertured plate being movable relative to each other so that a selected number of the plurality of apertures may be aligned with the window or windows of the masking plate, each of said apertured plates having a different number of apertures, and the relative movement of the plates of each valve element being interlinked with the relative movement or movements of the plate or plates of the other or others of said valve elements so that the number of apertures of each apertured plate aligned with the window or windows of its corresponding masking plate is in a predetermined relationship with the number of correspondingly aligned apertures of the other or others of said apertured plates for each relative disposition of said plates.

11. Fuel supply apparatus according to claim 10, wherein the hydrogen duct comprises a presetting valve disposed downstream of the non-return valve with respect to the engine intake.

12. A method of operating an internal combustion engine comprising the steps of:

(a) generating hydrogen gas by supplying water to a quantity of an alkali metal or alkaline earth metal in a reactor vessel, the supply of water being responsive to changes in gas pressure in the reactor vessel;

(b) admitting the generated hydrogen gas to a hydrogen duct communicating between the reactor vessel and the intake of the engine through a vacuum-operated non-return valve;

(c) supplying air to the engine intake through a duct communicating between the atmosphere and the engine intake and/or supplying oxygen from an oxygen source to the engine intake through an oxygen duct communicating between said source and the engine intake; and (d) controlling the flow of hydrogen gas through the hydrogen duct in proportion to the flow of air through the air duct and/or the flow of oxygen through the oxygen duct by valve means disposed in each of said ducts, each of which is adapted for controlling at least in part the flow of gas through the respective duct, and is interlinked with the other or others of said valve means.

* * * * *

UNITED STATES PATENT AND TRADEMARK OFFICE
CERTIFICATE OF CORRECTION

PATENT NO. : 4,411,223
DATED : October 25, 1983
INVENTOR(S) : Martin KIELY

It is certified that error appears in the above—identified patent and that said Letters Patent is hereby corrected as shown below:

Column 10, line 51, correct the spelling of "vessel".

Columb 15, line 53, change "dust" to --duct--.

Signed and Sealed this

Fourteenth Day of February 1984

[SEAL]

Attest:

GERALD J. MOSSINGHOFF

Attesting Officer    Commissioner of Patents and Trademarks